United States Patent
Reinsch et al.

(10) Patent No.: US 11,183,675 B2
(45) Date of Patent: Nov. 23, 2021

(54) ELECTRODE PRODUCTION METHOD BY BINDER FIBRILLATION USING A PARTICULATE FIBRILLATION AUXILIARY AGENT

(71) Applicants: Robert Bosch GmbH, Stuttgart (DE); GS Yuasa International Ltd., Kyoto (JP)

(72) Inventors: Bernd Reinsch, Ludwigsburg (DE); Leonore Glanz, Asperg (DE); Calin Iulius Wurm, Meitingen (DE); Harald Bauer, Ehningen (DE); Wolfgang Weydanz, Buckenhof (DE)

(73) Assignees: Robert Bosch GmbH, Stuttgart (DE); GS Yuasa International Ltd., Kyota (JP)

( * ) Notice: Subject to any disclaimer, the term of this patent is extended or adjusted under 35 U.S.C. 154(b) by 114 days.

(21) Appl. No.: 16/635,829

(22) PCT Filed: Jul. 30, 2018

(86) PCT No.: PCT/EP2018/070539
§ 371 (c)(1),
(2) Date: Jan. 31, 2020

(87) PCT Pub. No.: WO2019/025337
PCT Pub. Date: Feb. 7, 2019

(65) Prior Publication Data
US 2020/0220151 A1 Jul. 9, 2020

(30) Foreign Application Priority Data
Aug. 2, 2017 (DE) .......................... 102017213388.0

(51) Int. Cl.
*H01M 4/04* (2006.01)
*H01M 4/139* (2010.01)
*H01M 4/62* (2006.01)

(52) U.S. Cl.
CPC ............. *H01M 4/04* (2013.01); *H01M 4/139* (2013.01); *H01M 4/622* (2013.01)

(58) Field of Classification Search
None
See application file for complete search history.

(56) References Cited

U.S. PATENT DOCUMENTS

| | | |
|---|---|---|
| 3,898,099 A | 8/1975 | Baker et al. |
| 4,354,958 A | 10/1982 | Solomon |

(Continued)

FOREIGN PATENT DOCUMENTS

| | | |
|---|---|---|
| WO | WO2005/008807 A2 | 1/2005 |
| WO | WO 2005/049700 A1 | 6/2005 |

OTHER PUBLICATIONS

International Search Report corresponding to International Application No. PCT/EP2018/070539 dated Jan. 9, 2019 (English Translation).

(Continued)

*Primary Examiner* — Alix E Eggerding
(74) *Attorney, Agent, or Firm* — Jenkins, Wilson, Taylor & Hunt, P.A.

(57) ABSTRACT

The invention relates to a method for producing an electrode (E) for an electrochemical cell, in particular for a lithium cell. In order to produce a homogeneous mixture allowing the time-saving, cost-effective production, for example by dry coating, of an electrode (E) with improved properties and/or with a layer thickness significantly greater than 100 μm, for example for vehicle batteries, in particular for electric and/or hybrid vehicles, in said method at least one (Continued)

binder (B) and at least one particulate fibrillation auxiliary agent (F) are mixed in a mixing process with a high shear load, the at least one binder (B) being fibrillated (fB), and at least one electrode component (E1) is then added to the at least one fibrillated binder (B) in a mixing process with a low shear load. The invention also relates to an electrode (E) produced in this manner and to an electrochemical cell equipped with an electrode (E) of this type.

19 Claims, 1 Drawing Sheet

(56) References Cited

U.S. PATENT DOCUMENTS

| | | | |
|---|---|---|---|
| 4,379,772 A | | 4/1983 | Solomon et al. |
| 4,556,618 A | * | 12/1985 | Shia .................... H01M 4/8668 |
| | | | 429/217 |
| 5,707,763 A | | 1/1998 | Shimizu |
| 6,335,857 B1 | | 1/2002 | Takimoto et al. |
| 9,469,554 B2 | | 10/2016 | Zheng |
| 2015/0303481 A1 | * | 10/2015 | Duong .................... H01G 9/15 |
| | | | 429/217 |

OTHER PUBLICATIONS

Written Opinion corresponding to International Application No. PCT/EP2018/070539 dated Jan. 9, 2019.

* cited by examiner

ELECTRODE PRODUCTION METHOD BY BINDER FIBRILLATION USING A PARTICULATE FIBRILLATION AUXILIARY AGENT

The present invention relates to a process for the production of an electrode for an electrochemical cell, in particular for a battery cell, to an electrode thus produced, and to an electrochemical cell equipped with an electrode of this type.

PRIOR ART

Batteries, for example on the basis of lithium cells or sodium cells, such as lithium-ion cells or sodium-ion cells, offer a very high potential for energy saving and local avoidance of emissions for mobile and stationary applications.

The electrodes of lithium cells are conventionally produced by wet coating processes. The procedure generally used here mixes the electrode components with at least one solvent to give a (high-viscosity) liquid slurry which can then be used to configure a layer or coating, for example by means of a slot coater, a doctor blade or a roller application.

In order to remove the at least one solvent it is necessary to use long drying tunnels for slow and controlled drying of the layers or coatings. However, this results in long production time and high production costs, for example in the form of energy costs for drying, and also for provision, recovery and/or catalytic combustion of the at least one solvent.

Wet coating processes are moreover only capable of producing electrodes with restricted layer thickness, for example of up to 100 μm. Thicker electrodes would be desirable for large batteries such as those required in electric vehicles.

The documents US 2015/0303481 A1, WO 2005/008807 A2 (EP 1 644 136 A2), WO 2005/049700 A1, U.S. Pat. Nos. 4,556,618, 4,379,772, 4,354,958, 3,898,099 and 6,335,857 B1 relate to processes for the production of electrodes.

DISCLOSURE OF THE INVENTION

The present invention provides a process for the production of an electrode, for example of an anode and/or cathode, for an electrochemical cell. The process here can in particular be designed for the production of an electrode, for example of an anode and/or cathode, for a battery cell, in particular for a lithium cell or for a sodium cell or for a metal-air cell, for example for a lithium-ion cell and/or lithium-metal cell, or for a sodium-ion cell.

The process can in particular be designed for the production of an electrode, for example an anode and/or cathode, for a lithium cell, for example for a lithium-ion cell and/or lithium-metal cell.

In the process, in particular in a step a), at least one, in particular polymeric, binder and at least one particulate fibrillation aid are mixed by a high-shear mixing procedure, wherein the at least one binder is fibrillated.

In the process, in particular in a step b), at least one electrode component is (then) admixed with the at least one fibrillated binder, in particular from step a), by a low-shear mixing procedure.

The use of the high-shear mixing procedure can in particular realize shear which is higher than the shear realized by the low-shear mixing procedure and which can achieve fibrillation of the at least one binder. The high-shear mixing procedure can therefore in particular also be described as higher-shear mixing procedure.

Use of the low-shear mixing procedure can in particular realize shear which is lower than the shear realized by the high-shear mixing procedure. The low-shear mixing procedure can therefore in particular also be described as lower-shear mixing procedure.

The expression "high-shear mixing procedure" can in particular mean a mixing procedure in which—in particular in the absence of lubricant, for example liquid—particles are moved relative to one another, in particular where high shear arises, with large velocity gradients between particles and/or between particles and a wall of the mixer. It is in particular possible here that when the particles are exposed to high shear they fracture, for example break part. A high-shear mixing procedure can by way of example be carried out by a jet process, in particular using a jet mill, and/or by a three-roll mill and/or a twin-screw extruder.

The expression "low-shear mixing procedure" can in particular mean a mixing procedure in which streams of material are folded into one another, in particular where velocity gradients arising between the particles and/or arising between particles and a wall of the mixer are only small, and therefore shear arising is low. The particles here, exposed to low shear, can in particular retain their shape and/or be subject only to abrasion. A low-shear mixing procedure can by way of example be carried out by a paddle mixer, and/or by a static mixer, for example one based on elongational flows, for example resulting from a sequence of widenings and narrowings in a channel system, and/or by a gravity mixer.

The expression "particulate fibrillation aid" can in particular mean a material which takes the form of, in particular solid particles and which can fibrillate the at least one binder and which, in particular in the high-shear mixing procedure or under the conditions of the high-shear mixing procedure, has greater mechanical stability than the at least one electrode component.

In particular, the at least one particulate fibrillation aid can in essence be mechanically stable in particular in the high-shear mixing procedure or under the conditions of the high-shear mixing procedure. The expression "in essence mechanically stable" here can in particular mean that the at least one particulate fibrillation aid is not comminuted or ground by the high-shear mixing procedure, or is very little comminuted or ground by the said procedure, for example where, in the case of spherical particles by way of example, the average particle size and/or for example in the case of fibrous and/or tubular particles, the average particle length, for example average fibre length and/or tube length, of these and/or, for example in the case lamellar particles, the average diameter of the planar surface of these particles, is reduced by less than 10% by the high-shear mixing procedure, for example by less than 5%.

The mechanical stability of the at least one particulate fibrillation aid and/or of the at least one electrode component can by way of example be determined or classified on the basis of series of tests with the high-shear mixer types respectively to be used, for example a jet mill or another high-shear mixer, and by studying mixtures produced under comparable mixing conditions, for example by means of scanning electron microscopy (SEM).

During the high-shear mixing procedure, the at least one binder can be fibrillated, for example by a jet mill, for example by relative motion and/or collision with/bombardment onto particles of the at least one particulate fibrillation aid. The at least one binder here can in particular be shaped to give long fibrils (binder filaments). The surface of the particles of the at least one particulate fibrillation aid here can initially be coated with fibrils of the at least one fibrillated binder to some extent or else optionally completely, in particular insofar as the at least one particulate fibrillation aid does not serve as electrode-active material and therefore does not provide any reactive surface. The fibrils of the at least one fibrillated binder can then subsequently be distributed and bound on the at least one admixed electrode component.

It is therefore possible to produce a homogeneous mixture, for example in which the at least one fibrillated binder binds to the same extent to, for example all of the, particles of the at least one electrode component. From the resultant mixture it is then advantageously possible to configure an electrode by a dry production procedure, i.e. a production procedure, for example a coating process, which requires no solvent, for example by dry coating. This permits time-saving and inexpensive production—in particular without use of combustible, toxic and/or carcinogenic solvents—of electrodes with layer thickness significantly above 100 μm, by way of example for vehicle batteries, for example for electric vehicles and/or hybrid vehicles and/or plug-in hybrid vehicles, and/or for stationary storage batteries.

Because the at least one fibrillation aid for the fibrillation of the at least one binder is used in the high-shear mixing procedure, for example by a jet mill, and the at least one electrode component is used only subsequently in the low-shear mixing procedure, it is possible to protect the at least one electrode component advantageously from high mechanical loads and, respectively, comminution effects arising in the high-shear mixing procedure, and to avoid resultant undesirable changes to materials. This also advantageously permits processing of electrode components which are sensitive or have relatively low mechanical stability, examples being soft, brittle, fragile and coated components, examples being relatively soft, laminar intercalation graphite serving as anode active material and/or brittle and/or fragile storage alloys serving as anode active material, for example silicon alloys and/or tin alloys, and/or coated electrode components serving as anode active material or cathode active material, for example in the form of particles with a particle core and a particle shell surrounding the particle core (core-shell particles), and/or in the form of gradient-material particles as the at least one electrode component, while minimizing aggressive effects on the materials and at the same time protecting the said components from undesirable changes to materials.

The expression "gradient-material particles" can in particular mean particles which, within the particle and/or from the surface or from the perimeter of the particle to the core of the particle, exhibit varying properties and/or exhibit a gradient in respect of material.

By way of example, because the at least one fibrillation aid is used in the high-shear mixing procedure for the fibrillation of the at least one binder, and the at least one electrode component is admixed only in the low-shear mixing procedure, electrode components that are soft, brittle and/or fragile can be protected from comminution and/or excessive grinding and thus from reduction of their average particle size and/or of their average particle length, for example fibre length and/or tube length, and/or of the average diameter of their planar particle surface, and/or optionally also from undesirable change of their particle shape.

It is therefore possible firstly, for example in the case of intercalation graphite and/or storage alloys, to avoid reduction of their reversible storage capacity and/or increase of irreversible losses due to, in particular increased, formation of overlayers, for example through binding of lithium at their surface, when the cell is first brought into operation.

Secondly, it is thus possible to avoid production of small particles and/or change of particle shape, for example conversion of spherical graphite particles to lamellar graphite particles by shear along the slip planes of the graphite; this can lead to impairment of properties, for example of the morphology of the electrode, for example of its porosity, and therefore inter alia by way of example of its wetting behaviour, current carrying capability and/or capacitance, and also its surface structure and surface reactivity.

Because, furthermore, the at least one fibrillation aid is used in the high-shear mixing procedure for the fibrillation of the at least one binder and the at least one electrode component is admixed only in the low-shear mixing procedure, it is possible to protect particle overlayers of coated electrode components, for example in the form of particles with a particle core and with a particle shell surrounding the particle core (core-shell particle), and/or gradient-material particles, from damage and/or destruction; this could otherwise likewise lead to reduction of their reversible storage capacity and/or to increased irreversible losses resulting from, in particular increased, formation of overlayers, for example through binding of lithium at their surface, when the cell is first brought into operation, and could have an adverse effect on long-term stability.

It is therefore possible to produce a homogeneous mixture, for example in which the at least one fibrillated binder binds to the same extent to, for example all of the, particles of the at least one electrode component; from this it is possible, for example by a dry production procedure and/or by coating, for example by dry coating, for example of a current collector or of a supportive substrate, to achieve time-saving and inexpensive production of an electrode, for example an anode or a cathode, with improved properties and/or (also) with layer thickness significantly above 100 μm, for example for vehicle batteries, for example for electric vehicles and/or hybrid vehicles and/or plug-in hybrid vehicles, and/or for stationary storage batteries.

The high-shear mixing procedure, in particular in step a), can in particular be carried out by a jet mill and/or by a three-roll mill and/or by a twin-screw extruder and/or by a fluidized-bed opposed-jet mill and/or a ball mill and/or a mortar mill and/or a rolling mill ("rolling out") and/or a tablet press. The high shear forces here can result by way of example from relative motion of the at least one electrode component in relation to the at least one fibril-forming, in particular polymeric, binder. The relative motion of the materials in relation to one another can be particularly easily realized here by a rolling mill and/or a tablet press.

During the high-shear mixing procedure, in particular in step a), it can be advantageous to use a suitable particle size distribution of the at least one binder and of the at least one particulate fibrillation aid. In particular, the at least one particulate fibrillation aid can have a greater average particle size and/or a greater average particle length, for example average fibre length and/or tube length, and/or greater average diameter of its planar particle surface, than the at least one binder.

The high-shear mixing procedure can in particular be carried out at a temperature and/or a pressure at which the at least one particulate fibrillation aid is solid, or is present in solid form.

Within the framework of one embodiment, the high-shear mixing procedure, in particular in step a), is carried out by a jet mill. A jet mill can advantageously achieve homogeneous distribution of the at least one binder onto the at least one particulate fibrillation aid in a particularly simple and time-saving manner. A jet mill in particular achieves mixing of components by using a gas, for example air, with very high velocity which can extend as far as the velocity of sound. The actual mixing procedure here can advantageously take only 1-2 seconds, and can result in very high shear forces and therefore very high shearing load. It is thus advantageously possible to achieve very good and rapid fibrillation of the at least one binder. The embodiments explained above and below relating to use of at least one particulate fibrillation aid in the high-shear mixing procedure and of at least one electrode component, for example one that is less robust or has lower mechanical stability, in the low-shear mixing procedure are of particular interest when a jet mill is used for the high-shear mixing procedure, because the very high shear loading results in very high mechanical loads and, for example, destructive effects.

Within the framework of another embodiment, the at least one particulate fibrillation aid comprises, or is composed of, at least one inorganic material, for example at least one ceramic and/or glassy material, for example sand and/or silicon oxide, for example silicon dioxide ($SiO_2$), and/or aluminium oxide and/or another metal oxide, and/or at least one, in particular mechanically stable, metal, for example silicon and/or tin, and/or at least one, in particularly mechanically stable, metal alloy, for example silicon alloy and/or tin alloy, and/or at least one polymer and/or copolymer, for example at least one, in particular lithium-ion-conductive or lithium-ion-conducting, polymer and/or one copolymer thereof, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or one copolymer thereof, and/or at least one, optionally non-lithium-ion-conductive and/or non-lithium-ion-conducting, polymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene (PS) and/or at least one phenolic resin, such as Bakelite, and/or one copolymer thereof, for example polyethylene oxide-polystyrene copolymer (PEO-PS copolymer) and/or acrylonitrile-butadiene-styrene copolymer (ABS), and/or at least one pore-former and/or at least one solvent, for example at least one electrolyte solvent, in particular in solid form, for example with high melting point, for example in the range 0° C. to 25° C. or 30° C. or 40° C., and/or with low boiling point, for example in the range >25° C. or >30° C. or >40° C. to 100° C. or 120° C., and/or with high vapour pressure, for example dimethyl carbonate (DMC), and/or with low decomposition temperature, for example in the range >25° C. or >30° C. or >40° C. to 100° C. or 120° C.

Within the framework of another embodiment, the at least one, in particular polymeric, binder comprises, or is composed of, at least one, in particular lithium-ion-conductive or lithium-ion-conducting, polymer, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or one copolymer thereof and/or at least one, optionally non-lithium-ion-conductive or non-lithium-ion-conducting, polymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene (PS), and/or one copolymer thereof, for example polyethylene oxide-polystyrene copolymer (PEO-PS copolymer) and/or acrylonitrile-butadiene-styrene copolymer (ABS).

Within the framework of one version of these embodiments, not only the at least one binder but also the at least one particulate fibrillation aid comprises at least one polymer and/or copolymer.

Within the framework of one specific version of the above, the at least one binder comprises, or is composed of, at least one, optionally non-lithium-ion-conductive or non-lithium-ion-conducting, polymer and/or copolymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene (PS) and/or one copolymer thereof, wherein the at least one particulate fibrillation aid comprises, or is composed of, at least one, in particular lithium-ion-conductive or lithium-ion-conducting, polymer and/or one copolymer thereof, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or one copolymer thereof. By way of example, polyvinylidene difluoride (PvdF) as binder can be fibrillated by polyethylene oxide as particulate fibrillation aid by a high-shear mixing procedure, for example by a jet mill.

Within the framework of another specific version of the above, the at least one binder comprises, or is composed of, at least one, in particular lithium-ion-conductive or lithium-ion-conducting, polymer and/or one copolymer thereof, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or one copolymer thereof, wherein the at least one particulate fibrillation aid comprises, or is composed of, at least one, optionally non-lithium-ion-conductive or non-lithium-ion-conducting, polymer and/or copolymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene (PS) and/or one copolymer thereof.

Because the at least one, in particular polymeric, binder comprises at least one lithium-ion-conductive or lithium-ion-conducting polymer and/or one copolymer thereof, for example at least one polyalkylene oxide, for example polyethylene oxide, and/or one copolymer thereof, it is advantageously possible to use the at least one binder to provide not only binding properties but also lithium-ion conductivity within the electrode.

Because the at least one particulate fibrillation aid, in particular insofar as, as explained below, this remains in the mixture comprising the at least one fibrillated binder, comprises at least one lithium-ion-conductive or lithium-ion-conducting polymer and/or one copolymer thereof, for example at least one polyalkylene oxide, for example polyethylene oxide, and/or one copolymer thereof, it is advantageously possible to use the at least one particulate fibrillation aid to provide not only fibrillation of the at least one binder but also lithium ion conductivity within the electrode.

Within the framework of another embodiment, the at least one electrode component comprises, or is composed of, surface-coated particles and/or gradient-material particles and/or at least one electrode active material, in particular for energy storage, for example for storage of lithium, and/or comprises, or is composed of, at least one conductivity additive, in particular to improve electrical conductivity.

By way of example, the at least one electrode component can comprise, or be composed of, surface-coated particles, for example particles with a particle core and with a particle shell surrounding the particle core, "core-shell particles", and/or gradient-material particles and/or at least one anode active material and/or at least one cathode active material, for example at least one intercalation material and/or insertion material and/or recombination material, in particular at least one lithium or sodium intercalation material and/or lithium or sodium insertion material and/or lithium or sodium recombination material, for example intercalation graphite and/or at least one amorphous carbon with good insertion and/or intercalation properties, for example hard carbon and/or soft carbon, and/or at least one storage alloy, for example at least one lithium storage alloy, for example a silicon and/or tin alloy, in particular as anode active material, and/or at least one metal oxide and/or metal phosphate, for example at least one metal oxide, for example at least one layered oxide and/or at least one spinel, for example at least one oxide of nickel and/or of cobalt and/or of manganese, for example lithium nickel oxide and/or lithium cobalt oxide and/or manganese oxide, and/or at least one metal phosphate, for example at least one phosphate of iron and/or of manganese and/or of cobalt, for example at least one lithium iron phosphate and/or lithium manganese phosphate and/or lithium cobalt phosphate, for example based on the formula: $LiMPO_4$, where M=Fe, Mn and/or Co, in particular as cathode active material, and/or at least one conductivity-additive-electrode-active-material composite, for example at least one conductivity-additive-anode-active-material composite or conductivity-additive-cathode-active-material composite, for example at least one carbon-electrode-active-material composite, for example at least one carbon-anode-active-material composite or at least one carbon-cathode-active-material composite, for example at least one carbon-metal-phosphate composite, for example in the form of conductivity-additive-coated, for example carbon-coated, electrode-active-material particles, in particular anode-active-material particles or cathode-active-material particles, for example in the form of carbon-coated metal-phosphate particles, and/or at least one conductive carbon, for example conductivity graphite and/or at least one amorphous conductive carbon, in particular in the form of non-porous carbon particles, for example conductive carbon black, and/or carbon fibres and/or carbon nanotubes (CNT) and/or graphene and/or expanded graphite, and/or at least one conductive metal, for example silicon and/or tin and/or one other metal and/or one alloy, for example in the form of a metallic powder.

The expression "expanded graphite" can in particular mean a material which is produced by expanding graphite and serves for the provision of graphene and/or comprises graphene.

The expression "recombination material" can in particular mean an active material whose mode of operation is based on a recombination reaction and/or phase-transition reaction, for example $Li+Al \rightarrow LiAl$.

The expression "hard carbon" can in particular mean, in particular relatively stable, amorphous, carbon which has good insertion and/or intercalation properties and in particular which is non-graphitable and can be used as anode active material.

The expression "soft carbon" can in particular mean, in particular relatively stable, amorphous, carbon which has good insertion and/or intercalation properties and which in particular is graphitable and can be used as anode active material.

Within the framework of one version of this embodiment, the at least one electrode component comprises particles with a particle core and a particle shell surrounding the particle core, "core-shell particles", and/or gradient-material particles.

Within the framework of another, alternative or additional version of this embodiment, the at least one electrode component comprises, or is composed of, at least one conductive carbon, for example conductivity graphite and/or amorphous conductive carbon, in particular in the form of non-porous carbon particles, for example conductive carbon black and/or carbon fibres, for example with average diameter <<1 µm, usually ≤200 nm, and/or with average particle length, for example average fibre length and/or tube length, in the region ≥2 µm to ≤200 µm, for example ≥2 µm to ≤20 µm, and/or carbon nanotubes, for example with average diameter ≤50 nm, for example in the range ≥0.3 nm to ≤50 nm, and/or with average particle length, for example average fibre length and/or tube length, in the range ≥10 nm to ≤50 cm, for example ≥10 nm to ≤20 µm, and/or graphene and/or expanded graphite, and/or at least one conductive metal, for example silicon and/or tin and/or one other metal and/or one alloy, for example in the form of a metallic powder and/or at least one conductivity-additive-electrode-active-material composite, for example at least one conductivity-additive-anode-active-material composite or conductivity-additive-cathode-active-material composite, for example at least one carbon-electrode-active-material composite, for example at least one carbon-anode-active-material composite, or at least one carbon-cathode-active-material composite, for example at least one carbon-metal-phosphate composite, for example in the form of conductivity-additive-coated, for example carbon-coated, electrode-active-material particles, in particular anode-active-material particles, or cathode-active-material particles, for example in the form of carbon-coated metal-phosphate particles, for example with average particle size <10 µm or ≤8 µm or ≤6 µm, for example ≤4 µm or ≤2 µm or 1 µm.

Within the framework of another, alternative or additional version of this embodiment, the at least one electrode component comprises at least one electrode active material, in particular for energy storage, for example for storage of lithium. By way of example, the at least one electrode component can comprise, or consist of, at least one anode active material and/or cathode active material, for example at least one intercalation material and/or insertion material and/or recombination material, for example at least one lithium or sodium intercalation material and/or lithium or sodium insertion material and/or lithium or sodium recombination material.

By way of example, the at least one electrode component can comprise, or be composed of, intercalation graphite and/or can comprise, or be composed of, amorphous carbon having good insertion and/or intercalation properties, for example hard carbon and/or soft carbon, in particular as anode active material. Because the relatively soft, laminar intercalation graphite is admixed in the low-shear mixing procedure—and in particular not in the high-shear mixing procedure, it is advantageously possible, in the high-shear mixing procedure, for example by a jet mill, to prevent severe reduction of the particle size of the intercalation graphite and/or severe damage to the intercalation graphite, for example resulting from loss of cohesion between its layers.

Alternatively, or in addition to the above, the at least one electrode component can by way of example comprise, or be composed of, a storage alloy, in particular a lithium storage alloy, for example a silicon and/or tin alloy.

Alternatively, or in addition to the above, the at least one electrode component can by way of example comprise, or be composed of, at least one metal oxide and/or metal phosphate. By way of example, the at least one electrode component can comprise, or be composed of, at least one metal oxide, in particular at least one layered oxide and/or at least one spinel, for example at least one oxide of nickel and/or of cobalt and/or of manganese, for example lithium nickel oxide and/or lithium cobalt oxide and/or manganese oxide, and/or at least one metal phosphate, for example at least one phosphate of iron and/or of manganese and/or of cobalt, for example at least one lithium iron phosphate and/or lithium manganese phosphate and/or lithium cobalt phosphate, for example based on the formula: $LiMPO_4$, where M=Fe, Mn and/or Co, in particular as cathode active material.

Within the framework of another embodiment, at least the major part of the at least one particulate fibrillation aid, in particular more than 50% thereof, optionally more than 90% thereof, is removed after the fibrillation of the at least one binder. This can have an advantageous effect on the specific energy density of the electrode.

Within the framework of another embodiment, the at least one binder and the at least one particulate fibrillation aid and/or the procedure conditions, for example the procedure temperature, of the high-shear mixing procedure are selected in a manner that minimizes the adhesion between the at least one, in particular fibrillated, binder and the at least one particulate fibrillation aid. It is thus advantageously possible to simplify separation, in particular mechanical separation, of the at least one fibrillated binder and the at least one particulate fibrillation aid.

Within the framework of one specific embodiment, the at least one particulate fibrillation aid is removed before the at least one electrode component is admixed, in particular before step b). It is thus advantageously also possible to produce a compact and/or non-porous electrode from the at least one fibrillated binder. The at least one binder here can by way of example comprise at least one lithium-ion-conductive or lithium-ion-conducting polymer, and can provide ionic conductivity to the cell. The cell can therefore moreover optionally be designed as solid-state cell, for example with increased safety.

Within the framework of one version of this embodiment, after the fibrillation of the at least one binder, in particular after step a), for example in a step a1) downstream of the step a), the mixture comprising the at least one fibrillated binder and comprising the at least one particulate fibrillation aid is subjected to a comminution procedure, in particular chopping procedure, wherein the fibrils of the at least one fibrillated binder are comminuted to give shorter fibril sections. By way of example, in a step a2) downstream of the step a1) the fibril sections of the at least one fibrillated binder and the at least one particulate fibrillation aid, for example the mixture comprising the fibril sections of the at least one fibrillated binder and comprising the at least one particulate fibrillation aid, are (then) subjected to a separation procedure, for example gas-jet separation, for example air-jet separation, and/or to a sieving procedure, for example by means of a microsieve and/or of a sieve cascade, wherein the at least one particulate fibrillation aid and the fibril sections of the at least one fibrillated binder are separated from one another. It is thus possible to achieve particularly easy and effective separation of the at least one particulate fibrillation aid from the at least one fibrillated binder. The at least one electrode component can (then) be admixed with the fibril sections of the at least one fibrillated binder, in particular in a/the step b) downstream of the step a2), by the low-shear mixing procedure.

Within the framework of another version of this embodiment, the at least one particulate fibrillation aid is composed of at least one inorganic, for example ceramic and/or glassy, material. By way of example, the at least one particulate fibrillation aid can be sand. Particularly effective fibrillation of the at least one binder can thus be advantageously achieved. Particulate fibrillation aids of this type can moreover be particularly advantageously separated from the at least one fibrillated binder by the method described above.

By way of example, the at least one particulate fibrillation aid can be removed after or before the at least one electrode component is admixed, in particular after step b).

Within the framework of a specific version, the at least one particulate fibrillation aid is removed, for example in a step b1) downstream of the step b), after the at least one electrode component is admixed, in particular after step b). It is thus advantageously possible to produce a porous electrode from the at least one fibrillated binder. The pores here can by way of example be filled with at least one electrolyte, for example with at least one liquid electrolyte and/or polymer electrolyte, and the cell can thus be provided with ionic conductivity.

Within the framework of another specific embodiment, by way of example in step b1), for example after or before, in particular after, the at least one electrode component is admixed, in particular after step b), the at least one particulate fibrillation aid is removed thermally and/or by means of vaporization and/or by means of decomposition and/or by means of gasification and/or by means of combustion and/or by means of solvent extraction.

Within the framework of another embodiment, the at least one particulate fibrillation aid comprises at least one pore-former and/or at least one solvent, for example at least one electrolyte solvent, in particular in solid form, for example with high melting point, for example in the range ≥0° C. to ≤25° C. or ≤30° C. or ≤40° C., and/or with low boiling point, for example in the range >25° C. or >30° C. or >40° C. to ≤100° C. or ≤120° C., and/or with high vapour pressure, for example dimethyl carbonate (DMC), and/or with low decomposition temperature, for example in the range >25° C. or >30° C. or >40° C. to ≤100° C. or ≤120° C.

The high-shear mixing procedure here can in particular be carried out at a temperature and/or a pressure at which the at least one particulate fibrillation aid is solid or is present in solid form. The high-shear mixing procedure can optionally be carried out with cooling.

After the fibrillation procedure—and by way of example after or before the at least one electrode component is admixed—the at least one particulate fibrillation aid can then by way of example be removed thermally and/or by means of vaporization and/or by means of decomposition and/or by means of gasification and/or by means of combustion and/or by means of solvent extraction. By way of example, the at least one particulate fibrillation aid can be removed after the fibrillation procedure—and by way of example after or before the at least one electrode component is admixed—by heating to a temperature at which, and/or adjusting to a pressure, for example subatmospheric pressure, at which the at least one particulate fibrillation aid becomes gaseous and/or decomposes. By way of example, the at least one particulate fibrillation aid can be removed by heating the at least one particulate fibrillation aid to a temperature which—in particular at the prevailing and/or adjusted pressure—is above the boiling point and/or above the decomposition temperature of the at least one particulate fibrillation aid.

In this embodiment, the at least one particulate fibrillation aid can optionally, alternatively or additionally, comprise, or be composed of, at least one, for example non-lithium-ion-conductive and/or non-lithium-ion-conducting, polymer, for example made of polyethylene and/or polypropylene and/or polystyrene and/or at least one phenolic resin, such as Bakelite. Polymers of this type can be inexpensive and can sometimes be removed thermally and/or by means of solvent extraction.

Within the framework of another specific embodiment, after the at least one electrode component is admixed, in particular after step b), the at least one particulate fibrillation aid remains in the mixture comprising the at least one fibrillated binder and comprising the at least one electrode component.

The at least one particulate fibrillation aid can in principle be configured either for participation, or else for non-participation, in the (actual) electrochemical reaction of the cell, in particular for energy storage, for example with intercalation and/or deintercalation of lithium.

In one version, the at least one particulate fibrillation aid is configured by way of example for non-participation in the (actual) electrochemical reaction of the cell, in particular for energy storage, for example with intercalation and/or deintercalation of lithium.

In another version, the at least one particulate fibrillation aid is configured by way of example for participation in the (actual) electrochemical reaction of the cell, in particular for energy storage, for example with intercalation and/or deintercalation of lithium.

Within the framework of another embodiment, the at least one particulate fibrillation aid comprises, or is composed of, at least one electrode additive and/or at least one further electrode component. It is thus advantageously possible to provide an additional property and/or function to the electrode, and/or to achieve high specific energy density.

The at least one electrode additive here can in particular participate or not participate, in particular not participate, in the (actual) electrochemical reaction of the cell, in particular for energy storage, for example with intercalation and/or deintercalation of lithium. By way of example, the at least one electrode additive can be designed to intercept side-reactions and/or to scavenge side-reaction products, for example to scavenge impurities and/or hydrogen fluoride and/or water, and/or to improve the mechanical stability and/or processability of the electrode.

By way of example, the at least one electrode additive can comprise, or be composed of, at least one metal oxide, for example silicon oxide and/or aluminium oxide. Metal oxides, for example silicon oxide and/or aluminium oxide, can advantageously intercept side-reactions and/or scavenge side-reaction products, for example impurities and/or hydrogen fluoride and/or water. It is thus advantageously possible to provide an additional function to the electrode and/or to improve the properties and/or the lifetime of the electrode and therefore in particular also of the entire cell.

Alternatively, the at least one electrode additive can by way of example comprise, or be composed of, at least one, optionally non-lithium-ion-conductive or non-lithium-ion-conducting, polymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene and/or one copolymer thereof. It is thus advantageously possible to improve the mechanical stability and/or processability of the electrode.

The at least one further electrode component here can in particular participate in the (actual) electrochemical reaction of the cell, in particular for energy storage, for example with intercalation and/or deintercalation of lithium. In particular, the at least one further electrode component here can, in particular in the high-shear mixing procedure or under the conditions of the high-shear mixing procedure, have greater mechanical stability than the at least one electrode component.

By way of example, the at least one further electrode component here can comprise, or be composed of, at least one conductivity additive, in particular to improve electrical conductivity, for example at least one metal, for example silicon and/or tin and/or another metal, and/or at least one metal alloy, for example a silicon alloy and/or tin alloy, and/or at least one lithium-ion-conductive or lithium-ion-conducting polymer and/or copolymer thereof, in particular to improve ionic conductivity, and/or at least one electrode active material, in particular for energy storage, for example with intercalation and/or deintercalation of lithium. It is thus advantageously possible to achieve high specific energy density.

By way of example, the at least one further electrode component can comprise, or be composed of, at least one metal, for example silicon and/or tin and/or another metal and/or one alloy, for example in the form of a metallic powder, and/or at least one conductive carbon, for example conductivity graphite and/or at least one amorphous conductive carbon, in particular in the form of non-porous carbon particles, for example conductive carbon black, and/or carbon fibres and/or carbon nanotubes (CNT) and/or graphene and/or expanded graphite, and/or at least one conductivity-additive-electrode-active-material composite, for example at least one conductivity-additive-anode-active-material composite or conductivity-additive-cathode-active-material composite, for example at least one carbon-electrode-active-material composite, for example at least one carbon-anode-active-material composite or at least one carbon-cathode-active-material composite, for example at least one carbon-metal-phosphate composite, for example in the form of conductivity-additive-coated, for example carbon-coated, electrode-active-material particles, in particular anode-active-material particles or cathode-active-material particles, for example in the form of carbon-coated metal-phosphate particles and/or at least one lithium-ion-conductive or lithium-ion-conducting polymer and/or copolymer thereof, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or one copolymer thereof, for example polyethylene oxide-polystyrene copolymer (PEO-PS copolymer) and/or acrylonitrile-butadiene-styrene copolymer (ABS), and/or at least one anode active material and/or at least one cathode active material, for example at least one intercalation material and/or insertion material and/or recombination material, in particular at least one lithium or sodium intercalation material and/or lithium or sodium insertion material and/or lithium or sodium recombination material, for example intercalation graphite and/or at least one amorphous carbon with good insertion and/or intercalation properties, for example hard carbon and/or soft carbon, and/or at least one storage alloy, for example at least one lithium storage alloy, for example a silicon and/or tin alloy, in particular as anode active material, and/or at least one metal oxide and/or metal phosphate, for example at least one metal oxide, for example at least one layered oxide and/or at least one spinel, for example at least one oxide of nickel and/or of cobalt and/or of manganese, for example lithium nickel oxide and/or lithium cobalt oxide and/or manganese oxide, and/or at least one metal phosphate, for example at least one phosphate of iron and/or of manganese and/or of cobalt, for example at least one lithium iron phosphate and/or lithium manganese phosphate and/or lithium cobalt phosphate, for example based on the formula: $LiMPO_4$, where M=Fe, Mn and/or Co, in particular as cathode active material.

The average particle size and/or the average particle length, for example the average fibre length and/or tube length, and/or the average diameter of the planar surface of the particles of the at least one particulate fibrillation aid can in particular be in the order of magnitude of the electrode components or electrode constituents, for example the electrode active material. It is thus possible by way of example to improve wetting of the electrode with electrolyte, for example in an electrolyte-filling procedure, for example via a network of the at least one particulate fibrillation aid.

For the purposes of another embodiment, the at least one particulate fibrillation aid has, or is used with, for example in the case of spherical particles, an average particle size, in particular primary particle size, of ≤10 μm, for example ≤8 μm, for example ≤6 μm, and/or, for example in the case of fibrous and/or tubular particles, an average particle length, for example average fibre length and/or tube length, of ≤10 μm, for example ≤8 μm, for example ≤6 μm, and/or, for example in the case of lamellar particles, an average diameter of the planar surface of the particles of ≤10 μm, for example ≤8 μm, for example ≤6 μm. By way of example, the at least one particulate fibrillation aid can have, or can be used with, an average particle size, in particular primary particle size, and/or an average particle length, for example average fibre length and/or tube length, and/or average diameter of the planar surface of the particles in the range ≥0.01 μm to ≤10 μm, for example in the range ≥0.01 μm to ≤6 μm, for example in the range ≥4 μm to ≤6 μm.

Experimental studies have revealed that high-shear mixing procedures, for example by a jet mill, lead to the smallest average particle size or particle length that is achievable and therefore stable, an example being average fibre length and/or tube length, or diameter of the planar surface of the particles, in particular in the range 4 μm to 6 μm, and that particles whose particle size or particle length, for example fibre length and/or tube length, or diameter of the planar surface of the particles, is within this range cannot be further comminuted here—in particular because of the physical parameters of the mixer, for example of the mill, and the properties of the material. It is thus possible to minimize the comminuting effect exerted thereon by the high-shear mixing procedure.

The at least one particulate fibrillation aid can in principle have spherical and/or non-spherical particles, for example angular or round/oval particles and/or differently shaped particles.

However, within the framework of another embodiment, the at least one particulate fibrillation aid comprises, or is composed of, spherical particles. By way of example, the at least one particulate fibrillation aid can comprise, or be composed of, stable and/or compact spherical particles. Spherical particles can have greater mechanical stability than non-spherical particles, for example lamellar particles.

The quantity used of the at least one binder is in particular such as to ensure that the at least one binder can bind uniformly on all of the particles of at least one electrode component. In particular, it is possible here to avoid complete coverage of the surface of the particles of the at least one electrode component. It is preferable to configure only point contacts between the at least one binder and particle of the at least one electrode component. It is thus possible to maximize the active surface area available for the actual storage reaction.

The quantity used of the at least one binder, based on the total weight of the electrode, can by way of example be ≥0.1% by weight to ≤10% by weight, for example ≥0.2% by weight to ≤5% by weight. This has proved to be advantageous for achievement of uniform point-contact binding of the at least one binder on all the particles of the electrode components, and therefore for maximizing the active surface area available for the actual storage reaction.

The quantity used of the at least one electrode component, based on the total weight of the electrode, can by way of example be ≥0.1% by weight to ≤98% by weight for example ≥0.1% by weight or ≥20% by weight or ≥30% by weight or ≥50% by weight to ≤98% by weight or ≤90% by weight or ≤80% by weight.

It is possible by way of example in the process that the at least one binder is added in a plurality of stages, for example insofar as two or more different binders are to be used. By way of example, it is possible in the high-shear mixing procedure, in particular in step a), to begin by adding a first binder and then to add one or more further binders, and to mix these with the at least one particulate fibrillation aid.

However, within the framework of another embodiment, in particular in step a), at least one first binder and (the) at least one particulate fibrillation aid are mixed by a first high-shear mixing procedure, where the at least one first binder is fibrillated, and at least one second binder and (the) at least one particulate fibrillation aid, which may be the same as or different from the at least one particulate fibrillation aid used in the first mixing procedure, are mixed by at least one second high-shear mixing procedure, where the at least one second binder is fibrillated. This can have an advantageous effect on binder fibrillation.

The at least one electrode component can then be admixed with the at least one first fibrillated binder and the at least one second fibrillated binder by a low-shear mixing procedure, in particular in step b).

By analogy with the embodiments previously explained, it is possible that, before or after the at least one electrode component is admixed, some or all, for example the major part, of the at least one particulate fibrillation aid can then be removed from the at least one first and/or second fibrillated binder, or that the at least one particulate fibrillation aid then remains therein.

The process can by way of example be designed for the production of an anode. The at least one electrode component here can in particular comprise at least one anode active material, for example intercalation graphite and/or at least one amorphous carbon having good insertion and/or intercalation properties, for example hard carbon and/or soft carbon, and/or a storage alloy, for example a lithium storage alloy, for example a silicon and/or tin alloy. The quantity used of the at least one anode active material, based on the total weight of the electrode components of the anode, can by way of example be 80% by weight, optionally 90% by weight. The at least one electrode component here can moreover comprise at least one conductivity additive, for example at least one conductive carbon, for example amorphous conductive carbon, in particular conductive carbon black, and/or conductivity graphite and/or carbon fibres and/or carbon nanotubes and/or graphene and/or expanded graphite, and/or at least one conductive metal.

However, the process can also be designed for the production of a cathode. The at least one electrode component here can in particular comprise, or be composed of, at least one cathode active material, for example at least one metal oxide and/or metal phosphate, for example at least one metal oxide, in particular at least one layered oxide and/or at least one spinel, for example at least one oxide of nickel and/or of cobalt and/or of manganese, for example lithium nickel oxide and/or lithium cobalt oxide and/or manganese oxide, and/or at least one metal phosphate, for example at least one phosphate of iron and/or of manganese and/or of cobalt, for example at least one lithium iron phosphate and/or lithium manganese phosphate and/or lithium cobalt phosphate, for example based on the formula: $LiMPO_4$, where M=Fe, Mn and/or Co. The quantity used of the at least one cathode active material, based on the total weight of the electrode components of the cathode, can by way of example be 80% by weight, optionally 90% by weight. The average particle size, for example primary particle size, of the at least one cathode active material here can by way of example be in the range 0.5 µm to 20 µm, for example in the range 10 µm to 20 µm.

The at least one electrode component here can moreover by way of example comprise at least one conductive carbon, for example conductivity graphite and/or conductive carbon black. The quantity used of the at least one conductive carbon, for example conductivity graphite and/or conductive carbon black, based on the total weight of the electrode components of the cathode, can by way of example be ≥0.25% by weight to ≤20% by weight, for example ≥0.25% by weight to ≤10% by weight, in particular ≥0.5% by weight to ≤5% by weight. The at least one electrode component can moreover comprise at least one conductivity-additive-cathode-active-material composite, for example at least one carbon-cathode-active-material composite, for example at least one carbon-metal-phosphate composite, for example in the form of conductivity-additive-coated, for example carbon-coated, cathode-active-material particles, for example in the form of carbon-coated metal-phosphate particles, for example with average particle size <10 µm or ≤8 µm or ≤6 µm, for example ≤4 µm or ≤2 µm or ≤1 µm.

Within the framework of another embodiment, in a low-shear premixing procedure upstream of the high-shear mixing procedure, the at least one binder and the at least one particulate fibrillation aid are mixed to give a premixture, and this is then mixed in the high-shear mixing procedure, in particular in step a), in a manner that fibrillates the at least one binder. The premixing procedure can in particular be carried out in a step a0) upstream of the step a).

Within the framework of another embodiment, the low-shear mixing procedure and/or the low-shear premixing procedure is/are carried out by a gravity mixer and/or by a mixer based on the principle of turbulence resulting by way of example from elongational flows and/or from tube widenings and/or by a kneader and/or by an extruder and/or by a ploughshare mixer and/or paddle mixer and/or by a drum mixer. Mixing assemblies of this type can advantageously subject the electrode components to low shear, for example lower shear than a jet mill and/or a three-roll mill and/or a twin-screw extruder, in particular lower shear than a jet mill. Specifically, mixers based on the turbulence principle can advantageously subject a material to low load, for example because no internals are required and/or no "contact mixing" takes place.

Within the framework of another embodiment, for example in a step c) downstream of the step b), an electrode, in particular an anode and/or cathode, is formed from the mixture, in particular from step b) comprising the at least one fibrillated binder and comprising the at least one electrode component, for example by a dry production procedure and/or by coating, for example by dry coating, for example of a current collector or of a supportive substrate. From this mixture it is possible by way of example to form an electrode, for example in the form of a film, for example with defined porosity and/or defined thickness. The current collector can by way of example be a metallic collector foil or a current collector of another type, for example an expanded metal, a mesh, a metal braid, a metallized fabric, and/or a perforated or pierced foil, or a foil suitably prepared in any other manner.

In respect of further technical features and advantages of the process of the invention, reference is hereby explicitly made to the explanations provided in connection with the electrode of the invention and the cell of the invention, and also to the Figures and the description of the Figures.

The invention further provides an electrode, for example an anode and/or cathode, produced by a process of the invention.

An electrode, for example anode and/or cathode, produced by means of the process of the invention can by way of example be studied by scanning electron microscopy (SEM) and by way of example classified on the basis of damage to the individual components.

In respect of further technical features and advantages of the electrode of the invention, reference is hereby explicitly made to the explanations provided in connection with the process of the invention and the cell of the invention, and also to the Figures and the description of the Figures.

The invention further provides an electrochemical cell, in particular a battery cell, for example a lithium cell or a sodium cell or a metal-air cell, for example a lithium ion cell and/or lithium metal cell or a sodium ion cell, in particular a lithium cell, for example a lithium ion cell and/or lithium metal cell, which comprises at least one electrode of the invention or electrode produced according to the invention.

In respect of further technical features and advantages of the cell of the invention, reference is hereby explicitly made to the explanations provided in connection with the process of the invention and the electrode of the invention, and also to the Figures and the description of the Figures.

DRAWINGS

Further advantages and advantageous versions of the subject matter of the invention are illustrated by the drawings and explained in the description below. It should be noted here that the drawings are merely descriptive and are not intended to restrict the invention in any way.

FIG. 1 is a flow diagram illustrating a first embodiment of a production process of the invention, where the at least one particulate fibrillation aid remains in the electrode;

FIG. 2 is a flow diagram illustrating a second embodiment of a production process of the invention, where the at least one particulate fibrillation aid is removed after the at least one electrode component is admixed; and FIG. 3 is a flow diagram illustrating a third embodiment of a production process of the invention, where the at least one particulate fibrillation aid is removed before the at least one electrode component is admixed.

FIGS. 1 to 3 show that at least one binder B and at least one particulate fibrillation aid F are optionally first mixed in a low-shear premixing procedure in an optional upstream step a0).

The at least one binder B can by way of example comprise, or be composed of, at least one, in particular lithium-ion-conductive or lithium-ion-conducting, polymer, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile, and/or at least one, optionally non-lithium-ion-conductive or non-lithium-ion-conducting, polymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene (PS), and/or one copolymer thereof, for example polyethylene oxide-polystyrene copolymer (PEO-PS copolymer) and/or acrylonitrile-butadiene-styrene copolymer (ABS).

The average particle size of the at least one particulate fibrillation aid F here can by way of example be 10 µm, for example in the range 0.1 µm to 10 µm.

Figure 3:
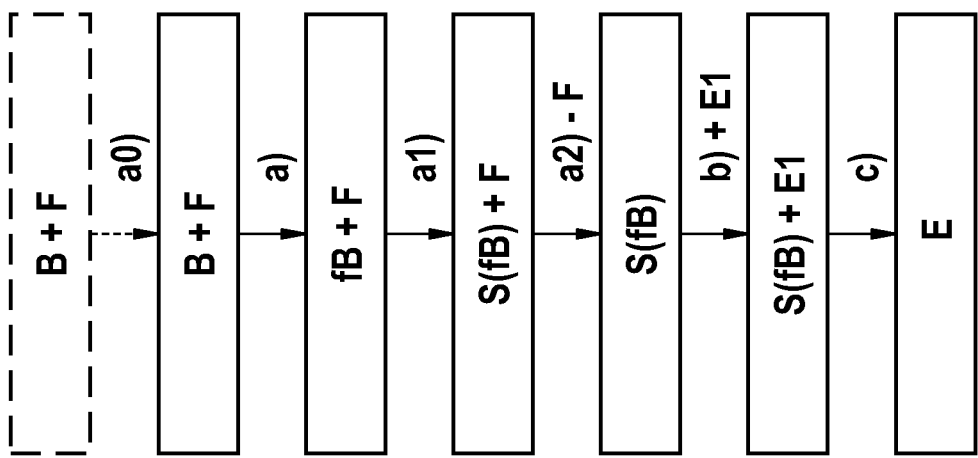
FIGS. 1 to 3 illustrate different embodiments of a process of the invention for the production of an electrode, in particular an anode or a cathode, for an electrochemical cell, in particular for a battery cell, for example for a lithium cell.
Figure 2:
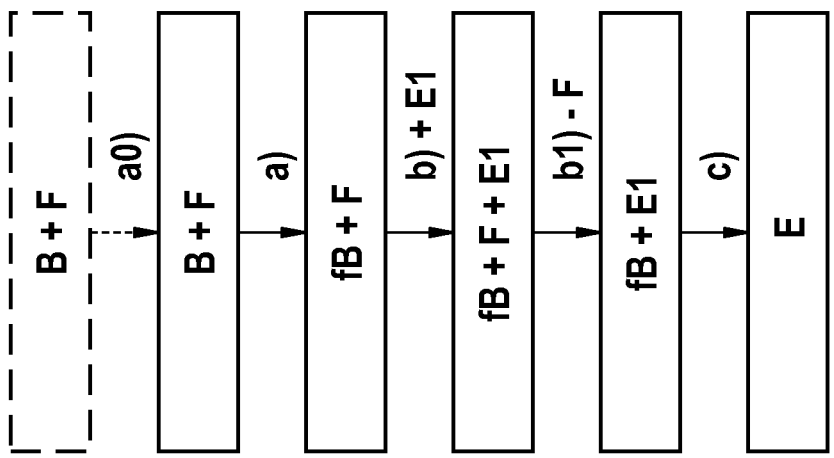
Figure 1:
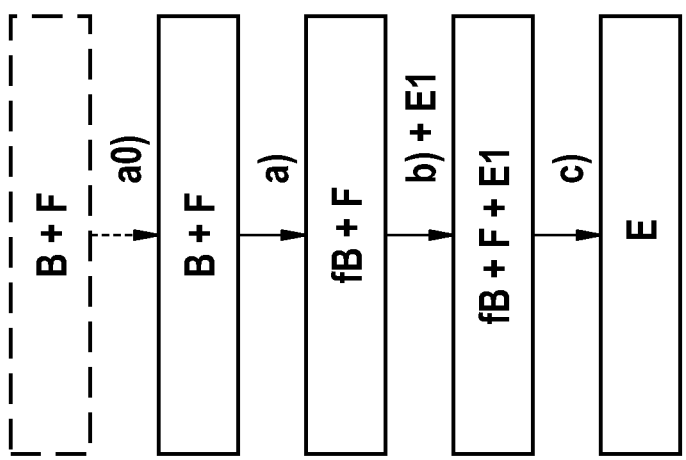

FIGS. 1 to 3 moreover show that the at least one binder B and the at least one particulate fibrillation aid F, optionally in the form of the premixture from the optional upstream step a0), are mixed in a high-shear mixing procedure in a step a), where the at least one binder B is fibrillated fB. The high-shear mixing procedure can by way of example be carried out by a jet mill.

FIGS. 1 to 3 moreover show that at least one electrode component E1 is admixed with the at least one fibrillated binder fB by a low-shear mixing procedure in a step b). The at least one electrode component E1 here can by way of example comprise at least one electrode active material, in particular intercalation material and/or insertion material, and/or surface-coated particles and/or gradient-material particles and/or at least one conductivity additive.

FIGS. 1 to 3 further show that, in a step c), an electrode E is configured from the mixture fB+E1 from step b) comprising the at least one fibrillated binder fB and comprising the at least one electrode component E1, for example by a dry production procedure and/or by coating, for example by dry coating.

Within the framework of the embodiment shown in FIG. 1, after the at least one electrode component E1 is admixed, the at least one particulate fibrillation aid F remains in the mixture fB+F+E1 comprising the at least one fibrillated binder fB and comprising the at least one electrode component E1. The at least one particulate fibrillation aid F here can by way of example comprise, or be composed of, at least one electrode additive which in particular does not participate in the electrochemical reaction of the cell and/or at least one further electrode component which in particular participates in the electrochemical reaction of the cell.

The at least one electrode additive here can by way of example be designed to intercept side-reactions and/or to scavenge side-reaction products, and/or to improve the mechanical stability and/or processability of the electrode. By way of example, the at least one electrode additive can comprise, or be composed of, at least one metal oxide, for example silicon oxide and/or aluminium oxide, and/or at least one, optionally non-lithium-ion-conductive or non-lithium-ion-conducting, polymer, for example at least one fluorinated and/or unfluorinated polyolefin, for example polyvinylidene difluoride (PvdF) and/or polytetrafluoroethylene (PTFE, Teflon) and/or polyethylene (PE) and/or polypropylene (PP), and/or polystyrene and/or a copolymer thereof.

The at least one further electrode component here can by way of example comprise, or be composed of, at least one conductivity additive and/or at least one, in particular lithium-ion-conductive or lithium-ion-conducting, polymer and/or copolymer thereof, for example at least one polyalkylene oxide, for example polyethylene oxide (PEO), and/or at least one polyester and/or at least one polyacrylate and/or at least one polymethacrylate, for example polymethyl methacrylate (PMMA), and/or at least one polyacrylonitrile and/or one copolymer thereof, and/or at least one electrode active material.

In contrast to the above, for the purposes of the embodiments shown in FIGS. 2 and 3, after the fibrillation of the at least one binder fB, at least the major part of the at least one particulate fibrillation aid F, in particular more than 50% thereof, is removed.

Within the framework of the embodiment shown in FIG. 2, after the at least one electrode component E1 is admixed, the at least one particulate fibrillation aid F is removed in a step b1) downstream of the step b). The removal here can by way of example be achieved thermally and/or by means of vaporization and/or by means of decomposition and/or by means of gasification and/or by means of combustion and/or by means of solvent extraction.

Within the framework of the embodiment shown in FIG. 3, before the at least one electrode component E1 is admixed, the at least one particulate fibrillation aid F is removed in step b). The at least one binder B and the at least one particulate fibrillation aid F and/or the procedure conditions, for example the procedure temperature, of the high-shear mixing procedure are preferably selected here in a manner that minimizes the adhesion between the at least one binder B and the at least one fibrillation aid F. The at least one particulate fibrillation aid F here can in particular be composed of at least one inorganic, for example ceramic and/or glassy, material, for example of sand.

The process here in particular moreover comprises, downstream of the step a), a step a1) in which, after the fibrillation of the at least one binder B, the mixture fB+F from step a), comprising the at least one fibrillated binder fB and comprising the at least one fibrillation aid F is subjected to a comminution procedure, in particular chopping procedure, in which the fibrils of the at least one fibrillated binder fB are comminuted to give shorter fibril sections S(fB).

The process here moreover comprises, downstream of the step a1), a step a2) wherein the mixture S(fB)+F comprising fibril sections S(fB) of the at least one fibrillated binder fB and comprising the at least one particulate fibrillation aid F is then subjected to a separation procedure, for example gas-jet separation and/or a sieving procedure, where the at least one fibrillation aid F and the fibril sections S(fB) of the at least one fibrillated binder fB are separated from one another.

The at least one electrode component E1 is then admixed with the fibril sections S(fB) of the at least one fibrillated binder fB by the low-shear mixing procedure in the step b) downstream of the step a2).

The invention claimed is:

1. A process for producing an electrode for an electrochemical cell, in particular for a battery cell, for example for a lithium cell, wherein
mixing at least one binder and at least one particulate fibrillation aid by a high-shear mixing procedure, wherein the at least one binder is fibrillated, and
admixing at least one electrode component with the at least one fibrillated binder by a low-shear mixing procedure.

2. The process of claim 1, wherein the high-shear mixing procedure is carried out by a jet mill.

3. The process of claim 1, wherein, after the fibrillation of the at least one binder, at least the major part of the at least one particulate fibrillation aid, in particular more than 50% thereof, is removed.

4. The process of claim 1, wherein the at least one binder and the at least one particulate fibrillation aid, and/or the procedure conditions, in particular the procedure temperature, of the high-shear mixing procedure are selected in a manner that minimizes the adhesion between the at least one fibrillated binder and the at least one fibrillation aid.

5. The process of claim 1, wherein the at least one particulate fibrillation aid is removed before the at least one electrode component is admixed.

6. The process of claim 5, wherein,
after the fibrillation of the at least one binder, a mixture comprising the at least one fibrillated binder and the at least one fibrillation aid is subjected to a comminution procedure, in particular chopping procedure, wherein fibrils of the at least one fibrillated binder are comminuted to give shorter fibril sections, and the shorter fibril sections of the at least one fibrillated binder and the at least one particulate fibrillation aid are subjected to a separation procedure, in particular gas-jet separation, and/or to a sieving procedure, wherein the at least one fibrillation aid and the fibril sections of the at least one fibrillated binder are separated from one another,
in particular wherein the at least one electrode component is admixed with the fibril sections of the at least one fibrillated binder by the low-shear mixing procedure.

7. The process according to claim 1, wherein the at least one particulate fibrillation aid is removed after or before the at least one electrode component is admixed, in particular after the at least one electrode component is admixed.

8. The process of claim 7, wherein, in particular after the at least one electrode component (E1) is admixed, the at least one particulate fibrillation aid (F) is removed thermally and/or by means of vaporization and/or by means of decomposition and/or by means of gasification and/or by means of combustion and/or by means of solvent extraction.

9. The process of claim 1, wherein, after the at least one electrode component is admixed, the at least one particulate fibrillation aid remains in a mixture comprising the at least one fibrillated binder and the at least one electrode component.

10. The process of claim 9, wherein the at least one particulate fibrillation aid comprises, at least one electrode additive which does not participate in the electrochemical reaction of the cell and which is intended to intercept side-reactions and/or to scavenge side-reaction products and/or to improve the mechanical stability and/or processability of the electrode, and/or the at least one particulate fibrillation aid comprises, at least one further electrode component which participates in the electrochemical reaction of the cell.

11. The process of claim 1, wherein the at least one particulate fibrillation aid comprises at least one inorganic material, in particular at least one ceramic and/or glassy material and/or at least one metal and/or at least one metal alloy and/or at least one polymer and/or copolymer and/or at least one pore-former and/or at least one solvent, in particular at least one electrolyte solvent, in particular in solid form.

12. The process of claim 1, wherein the at least one binder comprises at least one, in particular lithium-ion-conductive or lithium-ion-conducting, polymer, in particular at least one polyalkylene oxide, for example polyethylene oxide, and/or at least one polyester and/or at least one polyacrylate and/or at least one polymethacrylate, for example polymethyl methacrylate, and/or at least one polyacrylonitrile, and/or one copolymer thereof, and/or at least one, in particular non-lithium-ion-conductive or non-lithium-ion-conducting, polymer, in particular at least one fluorinated and/or unfluorinated polyolefin, for example polyvinylidene difluoride and/or polytetrafluoroethylene and/or polyethylene and/or polypropylene, and/or polystyrene, and/or a copolymer thereof, for example polyethylene oxide-polystyrene copolymer and/or acrylonitrile-butadiene-styrene copolymer.

13. The process of claim 1, wherein:
the at least one binder comprises at least one, in particular non-lithium-ion-conductive or non-lithium-ion-conducting, polymer and/or copolymer, in particular at least one fluorinated or unfluorinated polyolefin, for example polyvinylidene difluoride, and/or copolymer thereof, and/or
the at least one particulate fibrillation aid comprises at least one, in particular lithium-ion-conductive or lithium-ion-conducting polymer and/or a copolymer thereof, in particular at least one polyalkylene oxide, for example polyethylene oxide, and/or a copolymer thereof, and/or
the at least one binder comprises at least one, in particular lithium-ion-conductive or lithium-ion-conducting, polymer and/or a copolymer thereof, in particular at least one polyalkylene oxide, for example polyethylene oxide, and/or a copolymer thereof, and/or the at least one particulate fibrillation aid comprises at least one, in particular non-lithium-ion-conductive or non-lithium-ion-conducting, polymer and/or copolymer, in particular at least one fluorinated or unfluorinated polyolefin, for example polyvinylidene difluoride, and/or copolymer thereof.

14. The claim 1, wherein the at least one electrode component comprises surface-coated particles and/or gradient-material particles and/or at least one electrode active material, in particular intercalation material and/or insertion material and/or recombination material, and/or at least one conductivity additive.

15. The process of claim 1, wherein, in a low-shear premixing procedure upstream of the high-shear mixing procedure, the at least one binder and the at least one particulate fibrillation aid are mixed to give a premixture that is then mixed in the high-shear mixing procedure to fibrillate the at least one binder.

16. The process of claim 1, wherein the low-shear mixing procedure and/or the low-shear premixing procedure is/are carried out with low shear by a gravity mixer and/or by a mixer based on the turbulence principle and/or by a kneader and/or by an extruder and/or by a ploughshare mixer and/or paddle mixer and/or by a drum mixer.

17. The process of claim 1, wherein an electrode is configured from a mixture which comprises the at least one fibrillated binder and the at least one electrode component (E1), in particular by a dry production procedure and/or by a coating, for example by dry coating.

18. Electrode, in particular anode or cathode, produced by the process of claim 1.

19. Electrochemical cell, in particular a battery cell, for example a lithium cell, comprising at least one electrode of claim 18.

* * * * *